(12) United States Patent
Veilleux et al.

(10) Patent No.: US 9,032,739 B2
(45) Date of Patent: May 19, 2015

(54) LOAD LIMITED ACTUATOR

(75) Inventors: Leo J. Veilleux, Wethersfield, CT (US); Nicholas Moura, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1037 days.

(21) Appl. No.: 13/083,820

(22) Filed: Apr. 11, 2011

(65) Prior Publication Data

US 2012/0255276 A1 Oct. 11, 2012

(51) Int. Cl.
*F02C 6/08* (2006.01)
*F16K 31/122* (2006.01)
*F15B 15/14* (2006.01)
*F01D 9/06* (2006.01)
*F02C 9/18* (2006.01)
*F01D 17/10* (2006.01)
*F02K 3/02* (2006.01)

(52) U.S. Cl.
CPC ............ *F15B 15/1433* (2013.01); *F02C 6/08* (2013.01); *F16K 31/1225* (2013.01); *F01D 9/065* (2013.01); *F02C 9/18* (2013.01); *F01D 17/105* (2013.01); *F02K 3/02* (2013.01); *Y02T 50/671* (2013.01)

(58) Field of Classification Search
CPC ............ F02C 6/08; F02C 9/18; F16K 31/122; F16K 31/1221; F16K 31/1225
USPC ............. 60/782, 785, 39.1; 251/324, 325, 77, 251/79, 80, 28
See application file for complete search history.

(56) References Cited

U.S. PATENT DOCUMENTS

| 4,715,779 | A | | 12/1987 | Suciu | |
|---|---|---|---|---|---|
| 4,874,066 | A | * | 10/1989 | Silberstein | 188/280 |
| 5,758,683 | A | * | 6/1998 | Cook | 137/115.26 |
| 6,401,446 | B1 | | 6/2002 | Gibbons | |
| 6,604,751 | B2 | | 8/2003 | Fox | |
| 6,666,015 | B2 | | 12/2003 | Dyer | |
| 6,782,952 | B2 | * | 8/2004 | Garay et al. | 166/374 |
| 7,147,006 | B2 | * | 12/2006 | Shaw et al. | 137/627.5 |
| 7,251,925 | B2 | | 8/2007 | Paradise | |
| 2007/0018040 | A1 | | 1/2007 | Wingett et al. | |
| 2007/0060436 | A1 | * | 3/2007 | Boddy | 475/84 |
| 2008/0028764 | A1 | | 2/2008 | Cadieux | |

FOREIGN PATENT DOCUMENTS

DE 3615269 A1 11/1987

OTHER PUBLICATIONS

The Great Britain Search Report dated Aug. 9, 2012.

\* cited by examiner

*Primary Examiner* — Andrew Nguyen
(74) *Attorney, Agent, or Firm* — Kinney & Lange, P.A.

(57) ABSTRACT

An actuator includes a first piston and a second piston. The first piston has a piston ring that separates a first chamber from a second chamber of the actuator. The first piston has an interior chamber that communicates with the first chamber. The second piston is disposed within the interior chamber of the first piston so as to be movable with respect thereto. The second piston has a surface that interfaces with the second chamber.

15 Claims, 4 Drawing Sheets

LOAD LIMITED ACTUATOR

BACKGROUND

The present invention relates to actuators. More particularly, the present invention relates actuators used in closed loop flow systems in aircraft and gas turbine engines.

Aircraft and gas turbine engines utilize various actuators to drive aircraft or engine structures to desired positions. For example, aircraft utilize linear actuators to move flight control surfaces such as flaps, slates, and spoilers. In gas turbine engines, actuators are used, for example, to rotate struts to desired positions and open and close bleed doors.

Unfortunately, many aircraft and gas turbine engine structures must be designed to be larger, heavier, and more structurally sound than would otherwise have been required in the absence of the linear actuators driving them. This "oversizing" of the structures results from a failure to adequately control the load output of the actuators. More particularly, many actuators rely on closed loop flow systems that do not adequately account for inertia of the fluid in the system. The inertia of the fluid becomes problematic when the structure(s) being actuated reaches a structural stop (e.g., a closed position). As a result of inertia fluid effects, the actuator exerts a load on the structure that exceeds desired limits. Repeatedly exceeding desired loads can cause excessive wear and failure of the actuator, connecting linkages, and structures being actuated.

SUMMARY

An actuator includes a first piston and a second piston. The first piston has a piston ring that separates a first chamber from a second chamber of the actuator. The first piston has an interior chamber that communicates with the first chamber. The second piston is disposed within the interior chamber of the first piston so as to be movable with respect thereto. The second piston has a surface that interfaces with the second chamber.

In another aspect, an actuator assembly includes an actuator and a flow regulating valve. The actuator has a first piston and a second piston. The second piston is movably disposed within an interior chamber of the first piston. The first piston separates a first chamber of the actuator from a second chamber. The interior chamber communicates with the first chamber via a port. The flow regulating valve is in fluid communication with the first chamber and the second chamber of the actuator to selectively regulate flow to both chambers.

DETAILED DESCRIPTION

Figure 1:
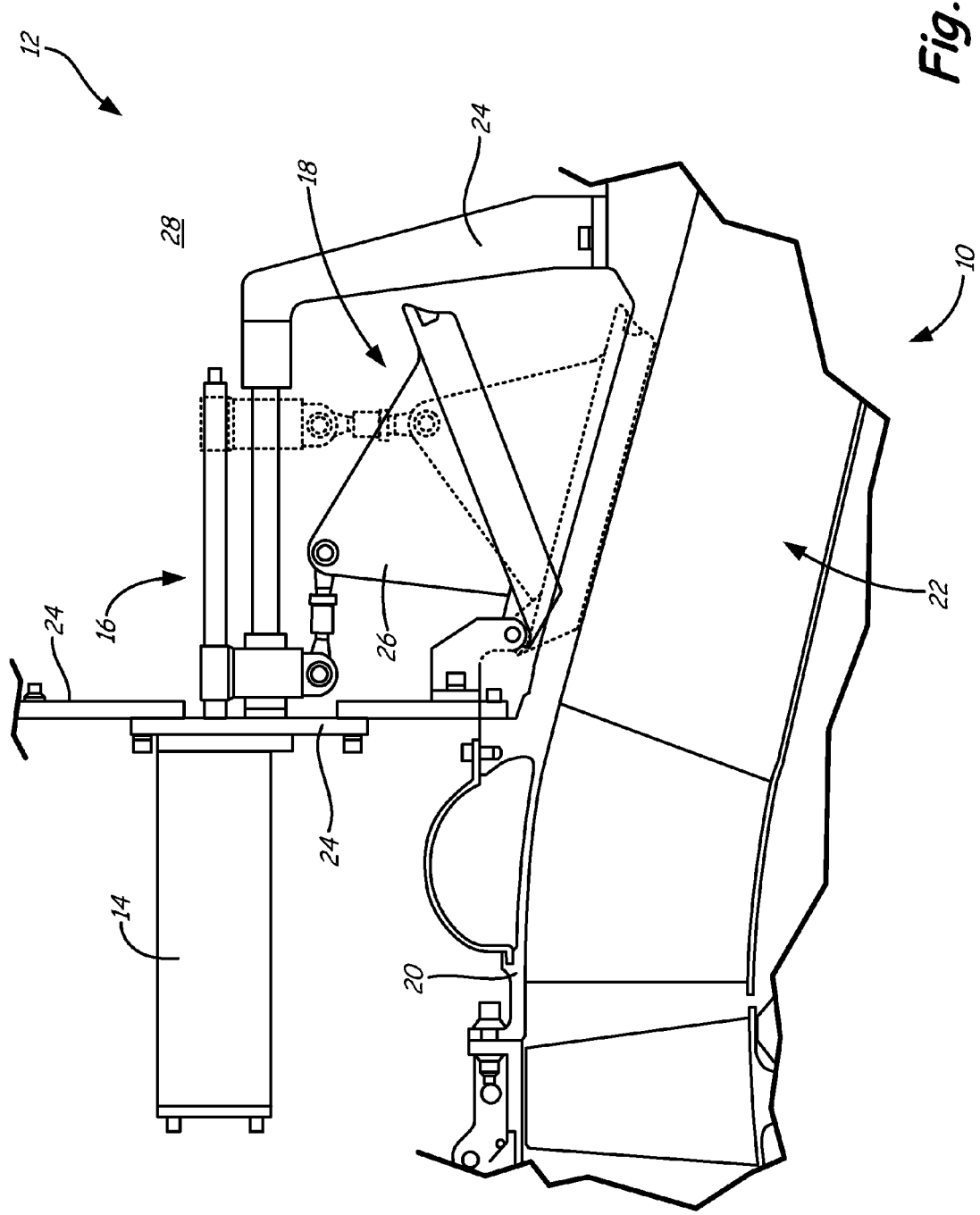
FIG. 1 is a sectional view of one embodiment of a gas turbine engine that has an actuator assembly, a linkage, and an engine structure being actuated.

FIG. 1 shows a cross section of a compressor section 10 of a gas turbine engine 12. Gas turbine engine 12 includes an actuator assembly 14, a linkage 16, a movable structure 18, a casing 20, a core flow path 22, and support members 24.

The operation and construction of gas turbine engine 12 is well known in the art, and therefore, does not warrant an extended discussion. The embodiment shown in FIG. 1 is of exemplary construction only, with actuator assembly 14 disposed adjacent to compressor section 10 of gas turbine engine 12. Linkage 16 connects to actuator assembly 14 and to engine structure 18. In the embodiment shown, engine structure 18 comprises a bleed door 26 that is coupled to linkage 16.

Actuator assembly 14 is disposed outward of casing 20 which together with bleed door 26 forms core flow path 22. Actuator assembly 14 and linkage 16 are disposed adjacent to casing 20 by support members 24. As illustrated in FIG. 1, structure 18 is driven by actuator assembly 14 via linkage 16 to one or more positions including a closed position and a maximum open position. When structure 18 is in one of the several open positions, a quantity of bleed air escapes core flow path 22 through a port to flow into plenum 28 surrounding casing 20. From the plenum 28 the bleed air is ducted onward for various engine and aircraft operations.

The construction of actuator assembly 14, linkage 16, and structure 18 are well known in the art, as disclosed in U.S. Pat. No. 4,715,779 and U.S. Patent Application Publication No. 2008/0028764, which are incorporated herein by reference. The construction of actuator assembly 14, linkage 16, and structure 18 will vary from embodiment to embodiment, and therefore, the embodiment shown in FIG. 1 is for exemplary purposes only. For example, in other embodiments linkage 16 may include a unison ring disposed about the core of gas turbine engine 12. In such an embodiment, structure 18 would comprise a plurality of bleed doors arrayed circumferentially around compressor 10. One or more actuator assemblies would drive open and close bleed doors via unison ring.

Additionally, the invention contemplates other applications for actuator assembly 14, for example, to rotate struts to desired positions in the gas turbine engine 12. In other embodiments, actuator assembly 14 can be used on aircraft, for example, to move flight control surfaces such as flaps, slates, and spoilers to desired positions.

Figure 2A:
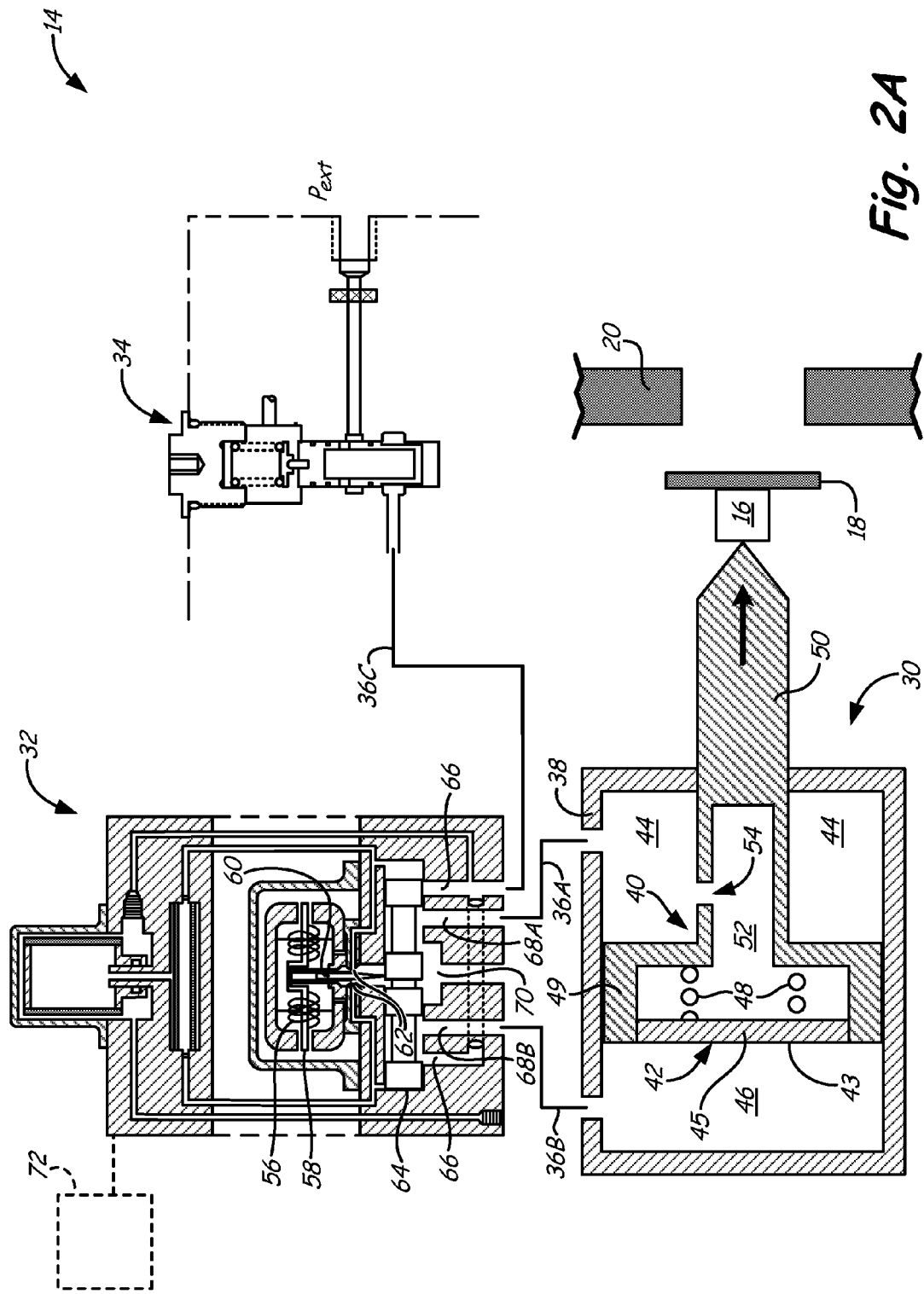
FIG. 2A is a schematic representation of components of the actuator assembly, the linkage, and the engine structure in a first position.

FIG. 2A shows components of actuator assembly 14 as well as linkage 16, structure 18, and casing 20. Actuator assembly 14 includes an actuator 30, a flow regulating valve 32, a pressure regulating valve 34, and flow passages 36A, 36B, and 36C. Actuator 30 includes a housing 38, a first piston 40, a second piston 42, a first chamber 44, a second chamber 46, and a spring 48. First piston 40 includes a piston ring 49, a stem 50, an interior chamber 52, and a port 54. Flow regulating valve 32 includes coils 56, an armature 58, a flapper valve 60, nozzles 62, a spool 64, a high pressure supply port 66, control ports 68A and 68B, and a return pressure port 70.

Actuator 30 is disposed in fluid communication with flow regulating valve 32 with flow passages 36A and 36B providing such communication between actuator 30 and flow regulating valve 32. Similarly, flow regulating valve 32 is in fluid communication with pressure regulating valve 34 via flow passage 36C. Pressure regulating valve 34 communicates with an external high pressure source Pext and is disposed upstream of flow regulating valve 32. Similarly, flow regulating valve 32 is disposed upstream of actuator 30. Pressure regulating valve 34 regulates pressure to flow regulating valve 32, which regulates flow to actuator 30. In response to changes in flow thereto, actuator 30 moves structure 18 to a desired position via linkage 16. The construction and operation of flow regulating valve 32 and pressure regulating valve 34 are known in the art as is disclosed in U.S. Pat. Nos. 6,401,446, 6,666,015, and 7,251,925, which are incorporated herein by reference.

Actuator 30 has a cylindrical housing 38 that surrounds first piston 40. Housing 38 has ports that allow fluid to be communicated to interior of housing 38 by flow passages 36A and 36B. First piston 40 is disposed within housing 38 and is able to translate relative thereto. Similarly, second piston 42 is disposed within first piston 40 and is movable relative thereto. First piston 40 sealingly separates first chamber 44 from second chamber 46. The size of first chamber 44 and second chamber 46 varies as first piston 40 translates. Spring 48 is disposed between first piston 40 and second piston 42. Second piston 42 has a surface 43 that interfaces with second chamber 46.

First piston 40 has a cylindrical first piston ring 49 that interfaces with housing 38. In the embodiment shown in FIGS. 2A-2C, has a second piston ring 45 of second piston 42 is disposed within and sealingly interfaces with first piston ring 49. Piston ring 49 is connected to stem 50, which extends through first chamber 44 and sealingly extends from housing 38 to connect to linkage 16. Piston ring 49 and a portion of stem 50 are hollow and together form interior chamber 52. In other embodiments, interior chamber 52 may be part of piston ring 49 only or stem 50 only. Port 54 extends through a side wall of stem 50 and allows for fluid communication between interior chamber 52 and first chamber 44.

In the embodiment shown in FIG. 2A, flow regulating valve 32 comprises a dual coil electro-hydraulic servo valve. Coils 56 of flow regulating valve 32 wrap armature 58 which is connected to flapper valve 60. Flapper valve 60 is positioned adjacent to and is capable of restricting flow through one of the two nozzles 62. Adjacent flapper valve 60 and nozzles 62, spool 64 is disposed to restrict or allow for desired communication of fluid between high pressure supply port 66, control ports 68A and 68B, and return pressure port 70. High pressure supply port 66 is connected to flow passage 36C and extends through flow regulating valve 32 to either side of spool 64. Similarly, control ports 68A and 68B are connected to flow passages 36A and 36B, respectively. Return pressure port 70 is also connected to a flow passage (not shown). Return pressure port 70 communicates with a lower pressure source external to actuator assembly 14 than high pressure supply port 66.

Upon application of a current from engine electronic control ("EEC") 72 to coils 56, armature 58 acts to move flapper valve 60 to restrict flow through nozzles 62. In response to restriction of one of the two nozzles 62, spool 64 translates to allow high pressure supply port 66 to communicate fluid flow to one of two control ports 68A or 68B. The movement of spool 64 also allows the other of the two control ports 68A or 68B to communicate with return pressure port 70. Fluid regulating valve 32 controls fluid flow and thereby pressure across the nozzles 62 by opening the flapper valve 60 in proportion to an applied current from the EEC 72. In response to varying amounts of current, spool 64 translates to a greater or lesser degree to allow communication of a greater or lesser amount of fluid between desired ports 66, 68A, 68B, and 70. Fluid regulating valve 32 can also be provided with a null current to equalize pressure in first and second chambers 44 and 46 to bring the actuator 30 into force balance in a desired position.

During operation of gas turbine engine 12, high pressure fluid such as aircraft fuel or air is transferred to actuator assembly 14 from high pressure external source Pext. External pressure Pext is regulated by pressure regulating valve 34 to prevent surge before passing downstream to high pressure supply port 66 of fluid regulating valve 32.

As illustrated in FIG. 2A, spool 64 is translated to allow a desired amount of fluid flow from higher pressure Pext source to communicate with second chamber 46 of actuator 30 via open control port 68B and flow passage 36B. Similarly, a desired amount of fluid flows from first chamber 44 to communicate with return pressure port 70 via open control port 68A and flow passage 36A. In response to the lack of force balance within actuator 30, first piston 40 begins to translate (slew) to move structure 18 from the first open position illustrated in FIG. 2A toward a closed position in contact with casing 20. As first piston 40 translates first chamber 44 decreases in volume while second chamber 46 increases in volume.

Figure 2B:
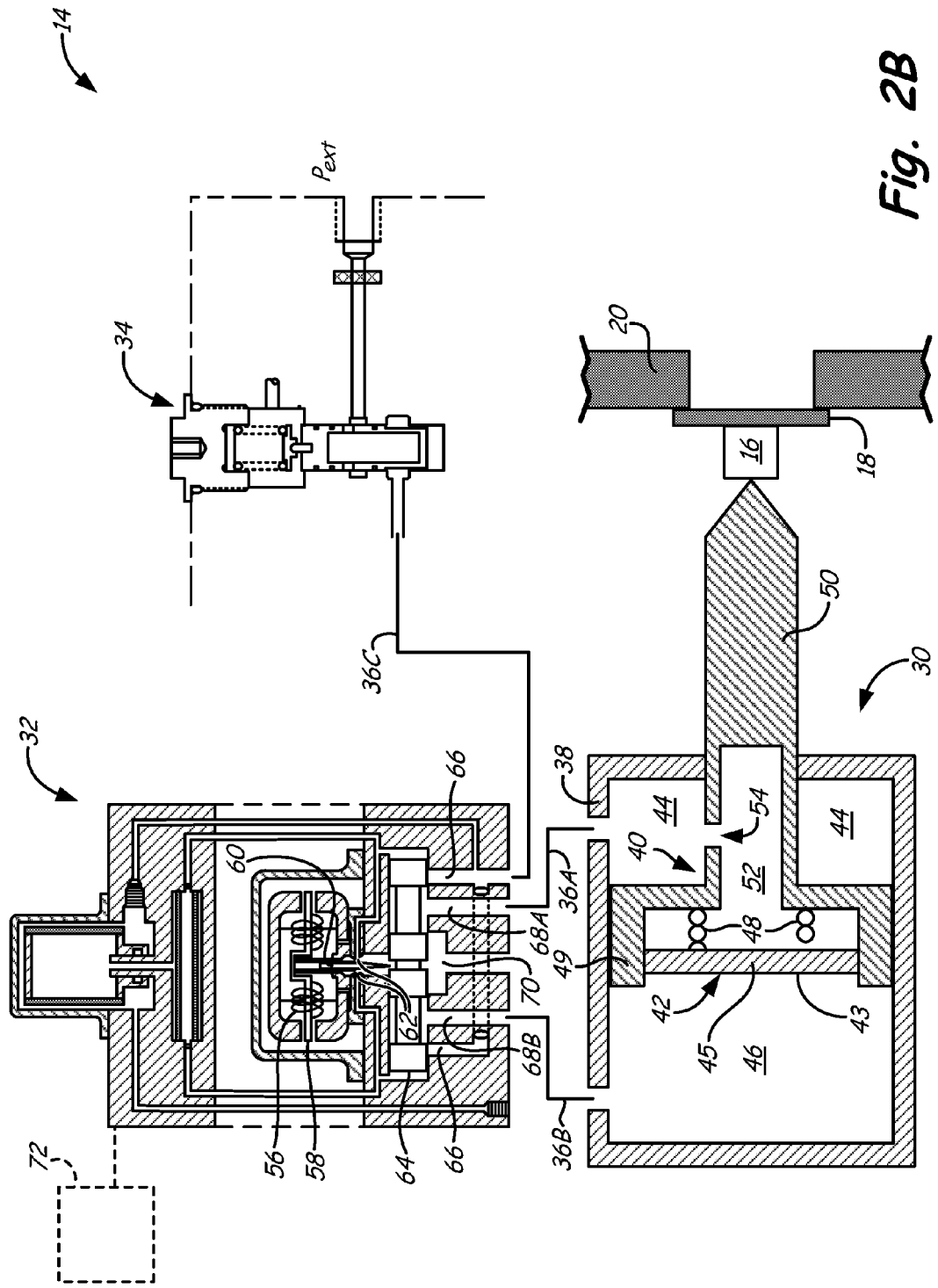
FIG. 2B shows the components of the actuator assembly, the linkage, and the engine structure in a second position.

FIG. 2B shows actuator assembly 14, linkage 16, and structure 18 with structure 18 in a second closed position contacting casing 20. More particularly, FIG. 2B shows second piston 42 translating relative to first piston 40 to reduce fluid inertia response in actuator 30 which results from fluid flow to actuator 30 stopping abruptly when first piston 40 contacts structure 18 against casing 20 and comes to a stop. As a result of fluid flow stopping to second chamber 46, pressure within the second chamber 46 increases due to fluid inertia. However, when this pressure increases sufficiently to overcome bias of spring 48, second piston 42 begins to translate relative to first piston 40 within interior chamber 52 to increase the volume of second chamber 46 and absorb inertia energy and thus prevent the pressure in second chamber 46 from further increasing. Actuation load on first piston 40, linkage 16 and structure 18 is reduced as fluid within interior chamber 52 is pumped through port 54 to first chamber 44 braking the translation of first piston 40.

Figure 2C:
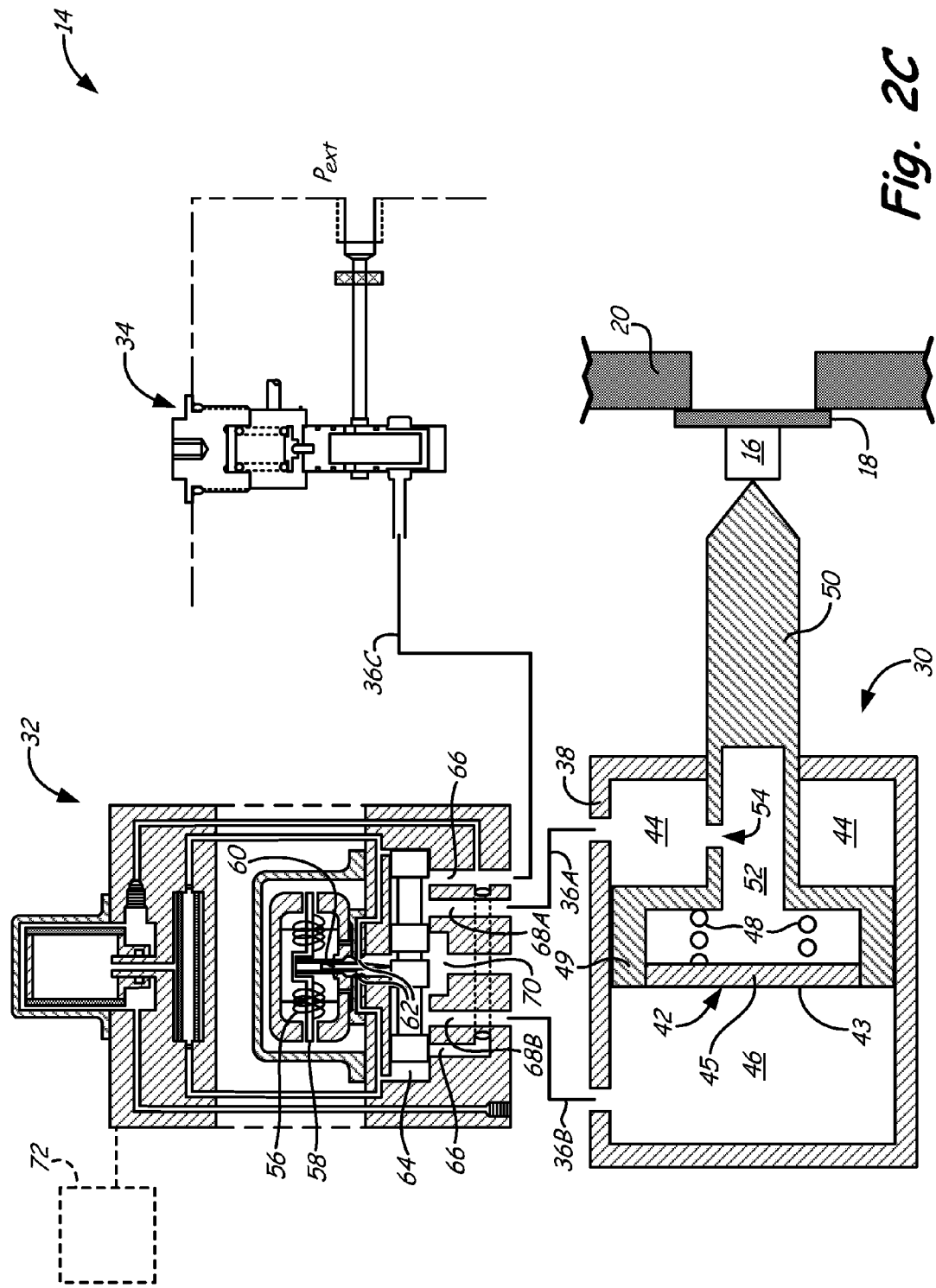
FIG. 2C shows the components of the actuator assembly, the linkage, and the engine structure with a second interior piston translating back toward the first position after inertial energy has been dissipated.

FIG. 2C shows the actuator assembly 14, linkage 16, and structure 18 with second piston 42 translating to the first open (neutral) position of FIG. 2A. After inertial energy within actuator 30 has been dissipated, second piston 42 is biased by spring 48 to translate back to a neutral position within interior chamber 52. If operation dictates that structure 18 should be reopened, for example, to bleed air off compressor 10 (FIG. 1), electronic engine control 72 applies current to flow regulating valve 32, which translates spool 64 to allow a desired amount of fluid flow from higher pressure Pext source to communicate with first chamber 44 of actuator 30 via open control port 68A and flow passage 36A. Similarly, a desired amount of fluid flows from second chamber 46 to communicate with return pressure port 70 via open control port 68B and flow passage 36B. In response to the lack of force balance within actuator 30, first piston 40 begins to translate (slew) to move structure 18 from the second closed position toward the first open position of FIG. 2A.

In most instances, first open position will comprise a second structural stop for actuator 30 with corresponding inertial effects. However, spring 48 can be designed to go into tension to allow second piston 42 to translate toward second chamber 46 relative first piston 40 to absorb inertial energy within actuator 30. First piston 40 and/or second piston 42 can be designed with a port or other passage that allows fluid to communicate between second chamber 46 and interior chamber 52 in order to brake the translation of first piston 40.

The disclosed actuator assembly 14 better accounts for fluid inertial effects in closed loop flow systems. By better accounting for fluid inertial effects, load spikes on the structures being actuated to a stop can be reduced. As a result the size of structures being actuated and the actuator itself can be reduced, saving valuable weight. Additionally, excessive wear and failure of the actuator, connecting linkages, and structures being actuated can be reduced.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An actuator assembly comprising:
an actuator having a first piston and a second piston, the second piston movably disposed within an interior chamber of the first piston, the first piston separates a first chamber from a second chamber and the interior chamber communicates with the first chamber via a port, the second piston has a surface that interfaces with the second chamber; and
a flow regulating valve in fluid communication with the first chamber and the second chamber of the actuator to selectively regulate flow to both the first chamber and the second chamber.

2. The assembly of claim 1, wherein the flow regulating valve comprises a servo valve that is disposed upstream of the actuator to provide modulated flow thereto in response to control signals from electronic engine control.

3. The assembly of claim 2, wherein the servo valve comprises a dual coil electro-hydraulic servo valve.

4. The assembly of claim 1, wherein the flow regulating valve is provided with a null current to equalize pressure in the first and second chambers to bring the actuator into force balance.

5. The assembly of claim 1, wherein the first piston is connected to an aircraft or engine structure via a linkage.

6. The assembly of claim 5, wherein the engine structure comprises a bleed door and the first piston drives the bleed door to one or more open positions and a closed position.

7. The assembly of claim 1, further comprising a pressuring regulating valve in fluid communication with and disposed upstream of the flow regulating valve.

8. The assembly of claim 1, wherein the interior chamber of the actuator extends generally axially through the first piston from a piston ring to a stem thereof, and wherein the port extends through a radial side wall of the stem.

9. The actuator of claim 1, further comprising a spring disposed between the first piston and the second piston.

10. The actuator of claim 1, wherein the first piston has a first piston ring, and wherein the second piston has a second piston ring that is disposed within and sealingly interfaces with the first piston ring.

11. The actuator of claim 1, wherein the interior chamber and the first chamber are filled with a fluid that is communicated between both the first chamber and the interior chamber via the port by movement of the second piston relative to the first piston.

12. A gas turbine engine comprising:
an actuator having a first piston and a second piston, the second piston movably disposed within an interior chamber of the first piston, the first piston separates a first chamber from a second chamber and the interior chamber communicates with the first chamber;
a linkage connected to the actuator; and
an engine structure coupled to the linkage, the engine structure driven by the actuator to one or more positions.

13. The gas turbine engine of claim 12, wherein the engine structure comprises a bleed door that is driven between a closed position and one or more open positions.

14. The gas turbine engine of claim 12 further comprising:
a flow regulating servo valve in fluid communication with the first chamber and the second chamber of the actuator to selectively regulate flow to both the first chamber and the second chamber; and
a pressuring regulating valve in fluid communication with and disposed upstream of the flow regulating valve.

15. The gas turbine engine of claim 12, wherein the interior chamber extends generally axially through the first piston from a piston ring to a stem thereof, and wherein a port extends through a radial side wall of the first piston to allow for communication of a fluid between the interior chamber and the first chamber.

* * * * *